Feb. 3, 1953        F. A. G. PIRWITZ ET AL        2,627,215
PHOTOGRAPHIC SHUTTER WITH SYNCHRONIZER Filed Oct. 9, 1948                                   5 Sheets-Sheet 1

INVENTORS
Friedrich A. Gustav Pirwitz
Gustave P. Pirwitz
BY Jack H. Sutton
George H. Schlueter
Charles Shepard
Their Attorney Feb. 3, 1953  F. A. G. PIRWITZ ET AL  2,627,215
PHOTOGRAPHIC SHUTTER WITH SYNCHRONIZER
Filed Oct. 9, 1948  5 Sheets-Sheet 3

INVENTORS
Friedrich A. Gustav Pirwitz
Gustave P. Pirwitz
BY Jack H. Sutton
George H. Schlueter
Charles Shepard
Their Attorney Patented Feb. 3, 1953

2,627,215

UNITED STATES PATENT OFFICE 2,627,215

PHOTOGRAPHIC SHUTTER WITH SYNCHRONIZER

Friedrich A. Gustav Pirwitz, Rochester, Gustave P. Pirwitz, Irondequoit, and Jack H. Sutton and George H. Schlueter, Rochester, N. Y., assignors to Wollensak Optical Company, Rochester, N. Y., a corporation of New York Application October 9, 1948, Serial No. 53,684

8 Claims. (Cl. 95—11.5)

1

This invention relates to a photographic shutter with a built-in synchronizer, that is, an electric switch arrangement built into the shutter casing for closing an electric circuit in properly timed or synchronized relation to the opening and closing movements of the shutter blades. The closing of the electric circuit may be employed, for example, to operate a photoflash bulb or lamp to provide the necessary illumination for the scene being photographed.

An object of the invention is the provision of generally improved and more satisfactory synchronizer mechanism for a photographic shutter.

Another object is the provision of synchronizer mechanism so designed and constructed as to be reliable, sturdy, and accurate in use, and to be readily installed and easily serviced.

Still another object is the provision of an improved synchronizer mechanism particularly adapted for a shutter of the "set" type, as distinguished from a shutter of the "automatic" type, and one which, with relatively few and simple moving parts, makes adequate provision for keeping the electric circuit open both when the shutter is run down or in its normal position of rest, and when it is being set or tensioned ready for the next exposure, so that if a photoflash bulb is inserted in the socket before the shutter is set or tensioned, it will not be prematurely lit.

A further object is the provision of an improved synchronizer mechanism of the kind above indicated, in which the electric circuit is entirely independent of the shutter casing, both sides of the circuit being insulated from the shutter casing instead of having one side grounded on the casing as is customary in many other types of synchronizers.

A still further object is the provision of an improved synchronizer mechanism in which the electric switch is operated by its own spring, controlled by but requiring no power from the main or master spring of the shutter, so that the operation of the synchronizer switch does not tend to retard the speed of exposure of the shutter, even to the slightest degree.

These and other desirable objects are accomplished by the construction disclosed as an illustrative embodiment of the invention in the following description and in the accompanying drawings forming a part hereof, in which:

The same reference numerals throughout the several views indicate the same parts.

The present invention may be considered as being in some respects an improvement upon the construction disclosed in our copending United States patent application, Serial No. 787,394, filed November 21, 1947, and now Patent No. 2,575,121, issued November 13, 1951, and the present application may be considered as a continuation in part of said copending application. Just as was the case in said copending application, the present invention may conveniently be applied to a camera shutter which, except for the synchronizer parts, may be in general of substantially the same construction as disclosed in United States Patent 2,331,568, granted October 12, 1943, for an invention of Pirwitz.

The shutter, further details of which are disclosed in said issued patent, comprises in general the usual approximately circular annular casing formed by an annular back wall 21, a marginal flange 23 extending forwardly from the outer edge of the rear wall (or extending upwardly, if the shutter be considered as lying on its back on a level table, instead of standing upright in normal position of customary use) and a lens tube 25 defining the exposure aperture which is opened and closed by coordinated movements of a series of shutter blades, usually five in number in a shutter of this particular type, one of which is indicated at 27, the others being omitted in order not to confuse the drawings, since the other blades are of the same construction as the one here shown and the arrangement of the series of overlapping blades is well understood in the art. The front of the casing is closed by the usual cover plate (not shown).

Each blade has a slot 29 in which there is a fixed stud 31 mounted on the casing or on some fixed part. Each blade is also mounted on a pivot stud 33 fixed to a blade ring or revolving ring 35 partly shown in dotted lines in Fig. 1. The blade ring 35 oscillates in a suitable annular bearing groove in a suitable plate. When the blade ring is turned as far as it will go in a counterclockwise direction, the shutter blades are closed, which is the position shown in Fig. 1. When the blade ring is turned in a clockwise direction, it moves the blade pivots 33 in the same direction, of course, but the tail ends of the blades are restrained by the fixed pivots 31 in the slots 29, so the blades are moved to the open position shown in Fig. 3.

Figure 5:
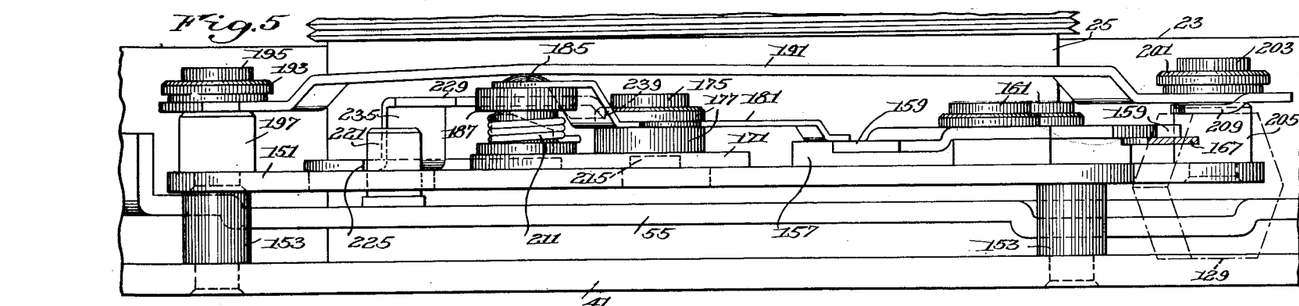
Fig. 5 is an edge view of certain of the parts shown in Fig. 4, removed from the shutter casing.

Most of the shutter operating mechanism is mounted directly or indirectly on a mounting plate or partition plate 41 (Figs. 5 and 10) which is slightly in front of the rear wall 21 of the shutter casing, while the shutter blades 27 and the usual iris diaphragm blades (not shown) are mounted behind the plate 41 in the space between it and the rear wall 21 of the casing. In order to operate the blade ring or revolving ring 35, and thereby operate the shutter blades, one of the studs 33 (the one shown in full lines in Fig. 1) extends forwardly through a slot 43 in the plate 41, and is engaged by the forked end of a blade lever or leaf lever 45 pivotally mounted on a screw stud 47. This blade lever 45 also has an arm extending approximately in the opposite direction from the forked end which engages the stud 33, and this other arm is provided at its lower edge with a beveled portion 49, while the upper edge forms a shoulder 51.

The main actuating lever or master lever 55 of the shutter is pivoted in the casing at 57 and is powered by a main spring or master spring 59 mounted on a stud 61, one end of the spring reacting against the casing wall 23 and the other end pushing leftwardly on the upper end of the master lever 55, thus constantly tending to drive the master lever with considerable force in a counterclockwise direction about its pivot 57.

A setting lever 65 pivoted at 67 extends out through a slot in the side wall of the casing to an accessible position, and a light spring 69 wound around the stud 67 engages the casing at one end and reacts against the lever 65 at the other end, constantly tending with light pressure to turn the setting lever 65 in a counterclockwise direction about its pivot. This setting lever has a forwardly extending ear 71 cooperating with a curved cam surface 73 on the master lever 55, in such fashion that when the setting lever 65 is turned in a clockwise direction on its pivot 67, against the influence of its light spring 69, from the position shown in Fig. 1 to the position shown in Fig. 2, the ear 71 thereon presses against the surface 73 of the master lever and swings the master lever in a clockwise direction on its pivot 57, against the force of the master spring 59.

The opposite end or lefthand end of the master lever 55 is provided with an ear portion or shoe portion 81, and with a rearwardly turned hook portion 83, both of which portions normally lie below the left end of the blade lever 45 when viewed as in Fig. 1, when the parts are in their run-down or rest position. When the master lever is set or tensioned by operating the setting lever 65, then the left end of the master lever moves upwardly when viewed as in Fig. 1, from the position there shown to the position shown in Fig. 2, and during such movement the hook 83 and the lug 81 slide over the inclined cam surface 49 on the blade lever, and the ear 81, after thus being displaced forwardly by the thickness of the blade lever (the master lever being slightly resilient in the direction of its thickness) snaps rearwardly past the shoulder 51 of the blade lever at approximately the same instant that the hook portion 83 snaps rearwardly beyond a latching shoulder 87 on the latching or release lever 89 pivoted in the casing at 91 and extending out through a slot to an accessible position externally of the casing. A light spring 93 coiled around the pivot stud 91 reacts at one end against a fixed part of the casing, and the other end of the spring reacts against the lever 89 in a way constantly tending to turn the release lever in a clockwise direction about its pivot 91.

Figures 1, 11:
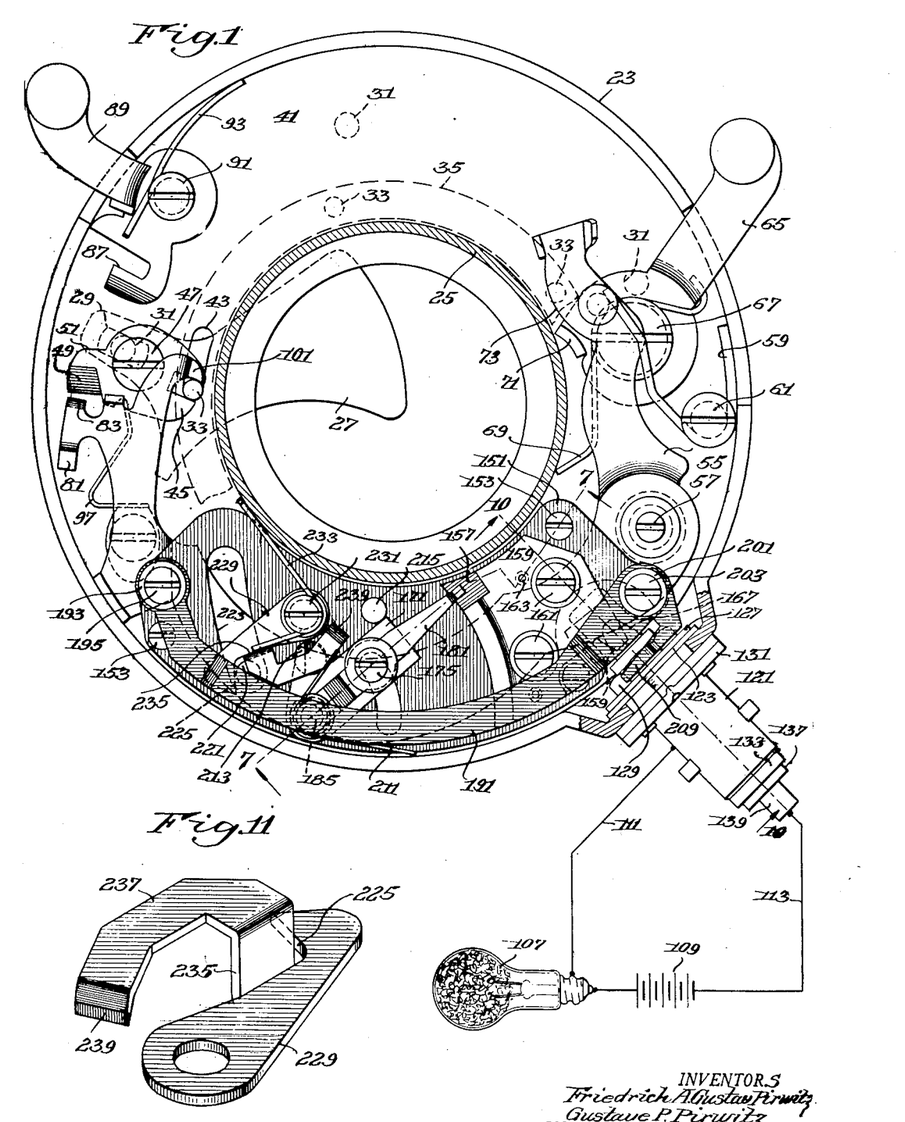
Fig. 1 is a front view of a shutter in accordance with a preferred embodiment of the present invention, with the cover and other parts removed for the sake of clarity, the parts shown being illustrated in the normal position of rest or rundown position following the completion of an exposure.
Fig. 11 is a perspective view of an operating lever for driving the electric switch under the control of the movement of the shutter master member.
Figures 2, 9:
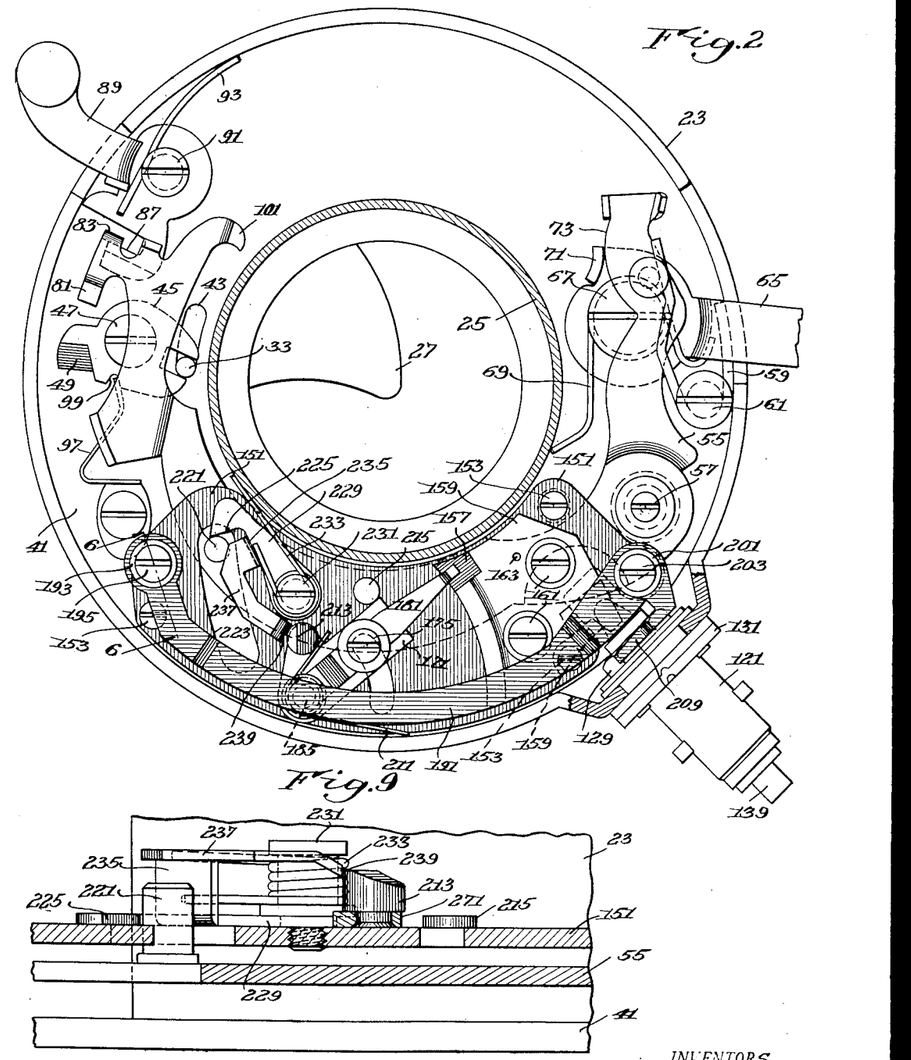
Fig. 2 is a view similar to Fig. 1 showing the parts in set or tensioned position ready for the making of an exposure.
Fig. 9 is a section taken substantially on the line 9—9 of Fig. 3.
Figures 3, 10:
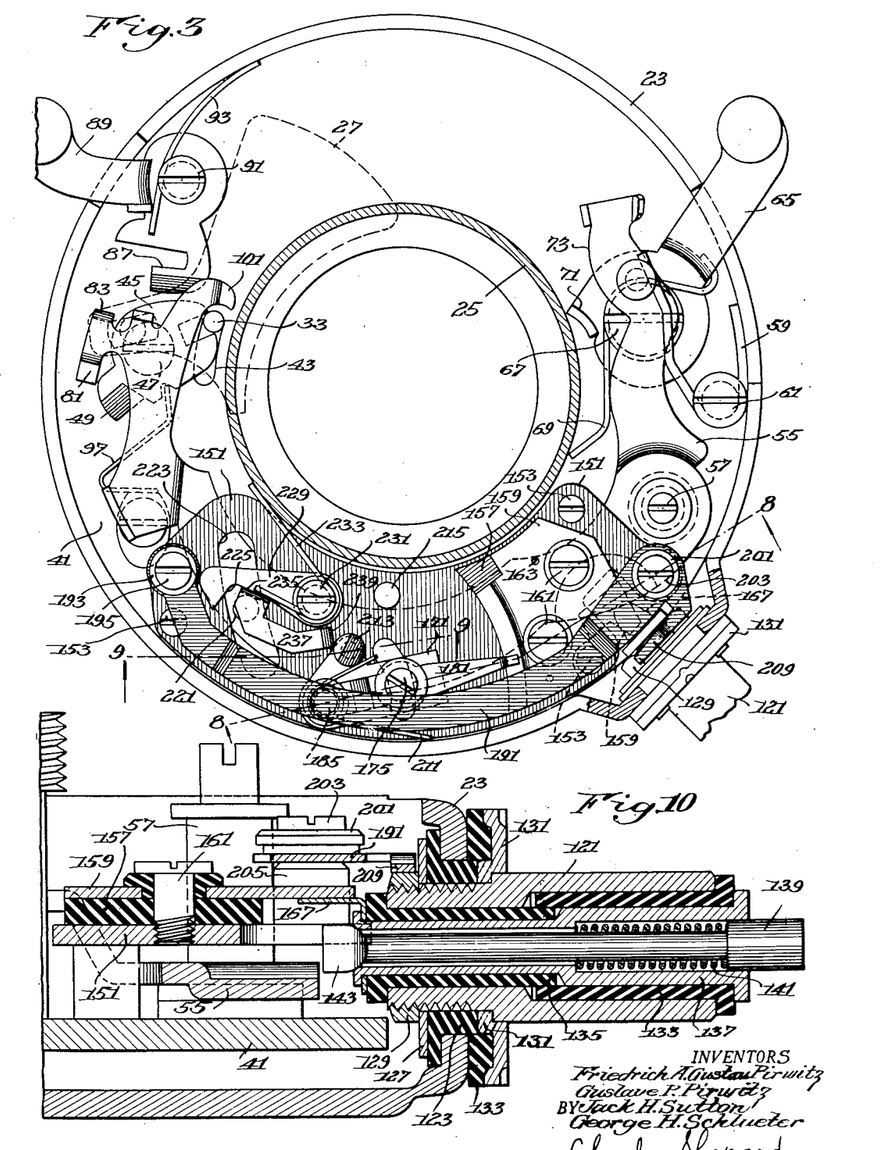
Fig. 3 is a similar view showing the parts in the midst of making an exposure, with the shutter blades wide open.
Fig. 10 is a section taken substantially on the line 10—10 of Fig. 1.
Figure 4:
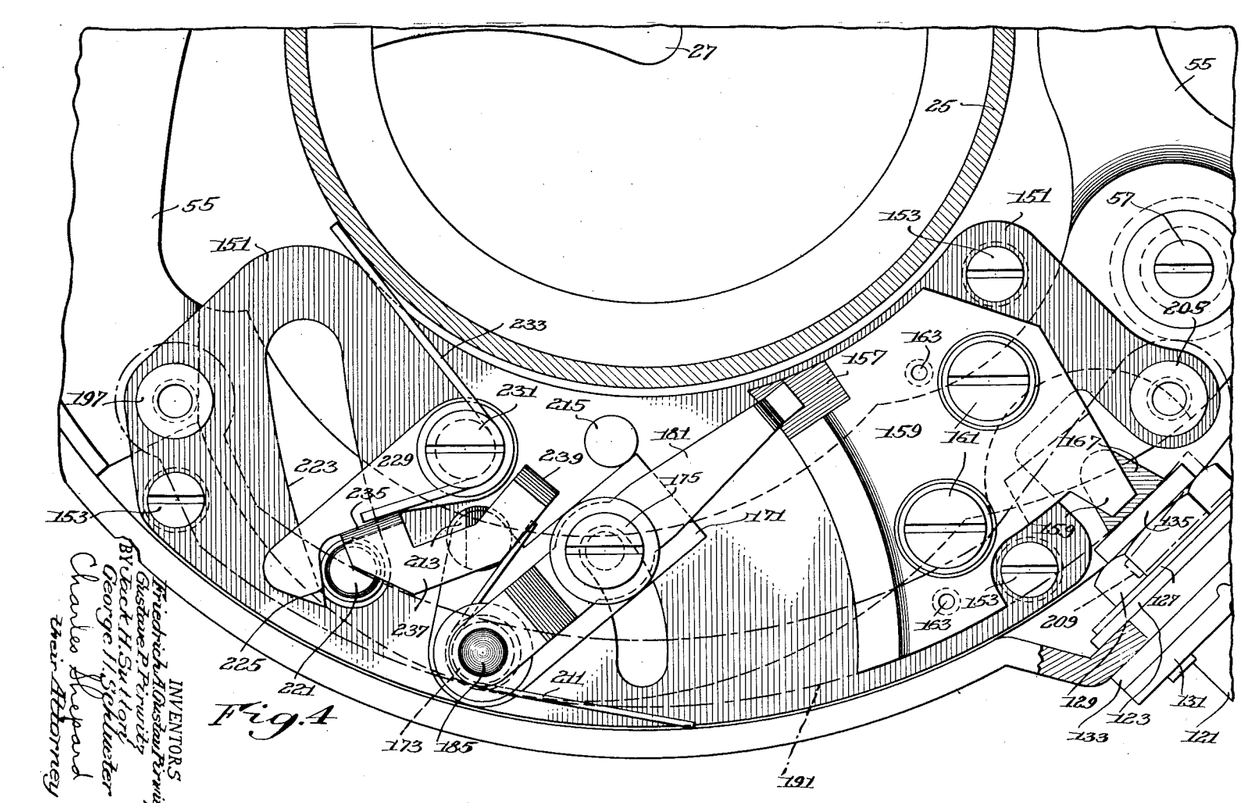
Fig. 4 is a view similar to the lower portion of Fig. 1, with the parts shown in the same positions as in Fig. 1, but with certain overlying parts omitted and indicated diagrammatically by broken lines, for the sake of better illustrating the parts beneath.

When the parts are in the set or tensioned position shown in Fig. 2, and the setting lever 65 is released so that its spring may swing it back from the position of Fig. 2 to the position of Figs. 1 and 3, if now the latching lever or release lever 89 is swung in a counterclockwise direction against the influence of its light spring 93, this will withdraw the shoulder 87 thereon from the hook 83 on the master member, thus releasing the master member for movement under the influence of the main or master spring 59. The master member will then move in a counterclockwise direction on its pivot 57, driven by the spring 59, more or less rapidly depending upon the operation of adjustable retarding mechanism used in timing the duration of the shutter exposure, which retarding mechanism is well known in itself and is omitted from the present drawings for the sake of clarity. As the master member swings in the counterclockwise direction, the lug 81 first engages the shoulder 51 on the blade lever, and swings this blade lever in a counterclockwise direction on its pivot 47, which thus causes upward movement of the stud 33 engaged by the blade lever 45 so as to swing the blade ring or revolving ring 35 in a clockwise direction, opening the shutter blades. During the first part of this movement of the blade lever 45, it distorts a bent leaf spring 97, one end of which is engaged in a notch 99 in the blade lever, until this notch passes a dead center position with relation to the spring, after which the spring expands again and helps to move the blade lever through the second half of its movement in a blade-opening direction.

Just about the time that the blades reach their fully opened position, the master member and the blade lever then being in approximately the relative positions shown in Fig. 3, the lug 81 on the master member slips off of the end of the shoulder 51 on the blade lever, and quickly thereafter a hook 101 on the master member engages the stud 33 and pulls this stud downwardly to swing the blade ring 35 in a counterclockwise direction and close the shutter blades. During the first half of this closing movement, the swinging of the blade lever 45 is resisted by the spring 97, and during the last half of the movement, the spring assists the movement of the blade lever.

The parts thus far described will be readily understood by those acquainted with photographic shutters of this type, and it is believed that no further explanation of these parts is necessary. Turning now to the synchronizer mechanism which is built into the shutter, this synchronizer mechanism comprises, in general, an electric switch arrangement for closing an electric circuit in proper timed relation to the opening movements of the shutter blades, and for keeping the electric circuit open at all other times, including the time that the shutter is in run-down or rest position, and the time that the shutter is being set or tensioned, so as to avoid accidental or premature operation of an electrically operated device controlled by this switch, such as a photoflash bulb or lamp indicated diagrammatically at 107 (Fig. 1). The lamp is electrically connected in the usual way with a source of current such as a battery 109, and wires indicated diagrammatically at 111 and 113 lead from the lamp and battery to the circuit parts built into the shutter.

For example, the shutter may include a metal conducting sleeve 121 (Figs. 1 and 10) which passes through an insulating bushing 123 in an opening in the side wall 23 of the shutter casing, and is held therein by metal washers 131 and 127 clamped tightly by a nut 129 threaded on the inner end of the sleeve 121, all in such a way that these metal parts do not make electrical contact with the shutter casing but are well insulated therefrom. In some constructions, it is customary to ground a somewhat similar sleeve on the shutter casing and to make one side of the electrical circuit run through the shutter casing and the other shutter parts electrically connected therewith. But in the present construction it is preferred to have the electrical circuit entirely independently of the shutter casing, and to insulate both sides thereof from the casing.

Inside the sleeve 121 there are insulating sleeves 133 and 135, within which there is a second metal sleeve 137 containing a metal rod or plunger 139 spring pressed in an outward direction by a spring 141 and held against moving too far outwardly by a riveted or flattened inner end 143 which is too large to pass through the sleeve 137. Thus the sleeve 121 and the parts 137 and 139 form the plug part of a bayonet connector, and are adapted to extend into and make electrical contact with a conventional bayonet connector jack of a kind commonly used in this art, which jack is connected to an electrical cable containing the wires diagrammatically illustrated at 111 and 113.

Figures 6, 7:
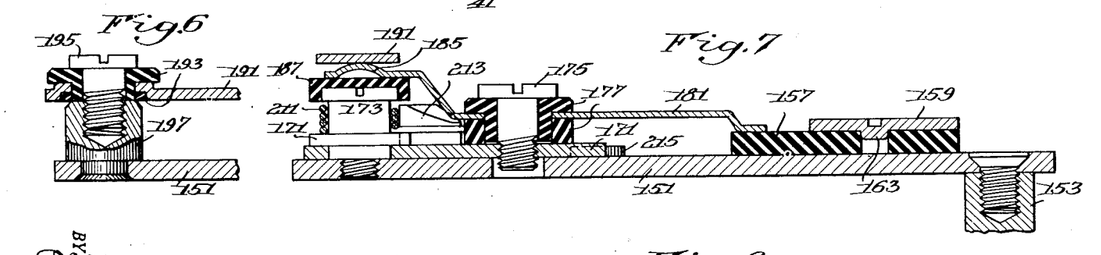
Fig. 6 is a section taken substantially on the line 6—6 of Fig. 2.
Fig. 7 is a section taken substantially on the line 7—7 of Fig. 1.
Figure 8:
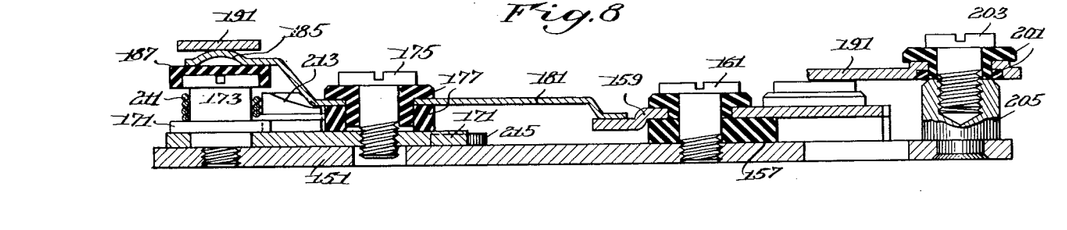
Fig. 8 is a section taken substantially on the line 8—8 of Fig. 3.

Except for the bayonet connection members just described, most of the synchronizer mechanism is mounted on a sub-assembly mounting plate 151 which is supported by studs 153 (Fig. 5) from the main mounting plate 41. Mounted on this sub-assembly plate 151 near the righthand end thereof is an insulating block 157, and on the top of this block a metal plate 159 is held by screws 161 which pass through insulating bushings so as to insulate the plate 151. The left edge of the plate 159 is of arcuate form as seen in Figs. 1–4 and is slightly depressed along its left arcuate margin as seen in Fig. 8 so that this portion of the metal plate is substantially flush with or a smooth continuation of the upper left corner of the insulating block 157 which here projects beyond the metal plate 159. Locating bosses 163 (Figs. 4 and 7) on the rear face of the plate 159 extend into locating holes in the insulating block 157, to help (along with the screws 161) in maintaining the metal plate 159 in accurate position on the insulating block 157. Near its righthand end, the metal plate 159 rests on and makes firm electric contact with an angular bracket 167 (Figs. 4 and 10) which is mounted on the inner end of the bayonet connector sleeve 137. In this way, the bayonet connector parts 137 and 139 are constantly electrically connected to the metal plate 159 which forms the stationary part of the electric switch.

The other or movable part of the electric switch includes a small metal plate 171 mounted to swing on a pivot 173 on the top of the sub-assembly plate 151, which metal plate 171 carries a stud 175, which, through insulating sleeves and washers 177, carries the movable electric contact member 181 in the form of a resilient metal finger having its right end in position to bear either upon the left edge of the metal plate 159 or on the upper left corner of the insulating block 157, depending upon the position to which the plate 171 is swung. The stud 175 holds the member 181 against the surface 157 or 159 in a slightly sprung condition, so as to make a good firm sliding contact with the surface 157 or 159. The opposite or left end of the metal switch member 181 is offset forwardly and, as indicated at 185, overlies an insulating cap 187 placed on the forward end of the screw stud 173, so as to be insulated therefrom. This end 185 is, in turn, overlain by a metal strip 191, the left end of which is held (Fig. 6) by insulating sleeves and washers 193 on a screw stud 195 screwed into a post 197 on the sub-assembly plate 151, and the right end of which metal strip 191 is similarly held by insulating sleeves and washers 201 on a screw stud 203 screwed into a post 205 on the sub-assembly plate 151. The metal strip 191 is somewhat resilient, and is held by its retaining screws in a slightly bowed or sprung position constantly pressing against the end 185 of the switch member 181, to make good electric contact therewith. Near its right end, the strip 191 has a lateral extension 209 which rests against and presses firmly against the nut 129 of the sleeve 121, to make good electric contact therewith.

The pivot 173 on which the movable switch member 181 swings is located at the center of the arc on which the left edge of the plate 159 is formed. A spring 211 coiled around this stud 173 reacts at one end against the shutter casing wall 23 and at the other end against an upstanding or forwardly extending stud 213 on the plate 171 and constantly tends to swing the plate 171 and contact member 181 in a counterclockwise direction on the pivot stud 173, the limit of such swinging being defined by a stud 215 on the plate 151 which lies in the path of the oscillating plate 171. When the parts are in rest position, with the plate 171 against the limit stop stud 215 (Figs. 1, 2, and 4) the end of the switch wiper arm 181 lies on the insulating block 157 and is out of contact with the metal plate 159, so that the switch is open. If the switch arm 181 be swung in a clockwise direction from this position, then the righthand end of the arm will slide off of the insulating block 157 and onto the metal plate 159, thus closing the switch.

For the purpose of swinging the switch arm to close the switch at the proper time, the master lever or actuating member 55 is provided with an upstanding or forwardly extending stud 221 (Figs. 2 and 9) which projects through an arcuate slot 223 in the plate 151 to a position in front of this plate, where it engages a surface 225 on a lever 229 (see also Fig. 11) which is pivoted on a stud 231 on the sub-assembly plate 151, on which stud is coiled a spring 233 having one end reacting against the lens tube 25 and the other end reacting against a forwardly extending ear 235 on the lever 229, so as to tend constantly to turn the lever 229 in a counterclockwise direction on its pivot stud 231. This ear 235 is extended at 237 in a lateral direction and terminates in a rearwardly turned tooth or ear 239.

The normal rest position of the parts is shown in Fig. 1, where the spring 233 has turned the lever 239 as far as it will go in a counterclockwise direction on its pivot 231. When the master member or actuating lever 55 is tensioned or set from the position shown in Fig. 1 to the position shown in Fig. 2, the pin 221 thereon engages the portion 225 of the lever 229 and swings the latter in a clockwise direction on its pivot 231 from the position shown in Fig. 1 to the position shown in Fig. 2. During this swinging movement, the ear or tooth 239 on the lever 229 engages the stud 213 on the switch plate 171, in a direction to tend to move the plate 171 in a counterclockwise direction, but since this plate is already at its extreme counterclockwise position (against the abutment stud 215) it cannot move any further in this direction and so the ear 239 slips over the top of the stud 213, which is beveled (Fig. 9) to assist this action, and snaps down on the left side of the stud 213.

Then when the shutter is released or tripped, to make an exposure, the stud 221 on the master member moves away from the portion 225 of the lever 229, so that the spring 233 of the lever 229 may swing the lever in a counterclockwise direction on its pivot. It is to be noted at this point that the master member does not have to apply any force whatever, during the exposure operation, to operate the synchronizer mechanism, the synchronizer being operated by its own operating spring 233, and being merely released by, rather than actually pushed by, the master member. Thus the synchronizer does not retard the operation of the shutter even to the slightest degree, but on the contrary the synchronizer operating spring 233 helps along and tends to accelerate the movement of the master member.

The spring 233 being somewhat stronger than the spring 211, and the tooth or ear 239 being now engaged against the stud 213, the movement of the lever 229 under the influence of its spring 233 is thus transmitted to the stud 213 and displaces this stud rightwardly, in a direction to cause clockwise swinging movement of the plate 171 against the force of its light spring 211. Shortly after the beginning of this swinging movement of the plate 171, the switch contact member 181 carried thereby moves into contact with the metal plate 159. Since the metal plate 159 is electrically connected through the bracket 167 to the inner members 137 and 139 of the bayonet connection, and since the switch arm 181 is electrically connected through the members 191 and 209 to the outer member 121 of the bayonet connection, it follows that the contact of the switch arm 181 with the plate 159 will close the electric circuit at this point and will thus operate or fire the photoflash lamp 107 if the latter is properly connected to the bayonet connector. It is also noted that the switch arm 181 has a relatively long swing over a considerable surface area of the plate 159, so that a good electrical contact is made for a substantial time interval, with no danger of failure of the photoflash lamp to fire, as sometimes happens when there is merely a momentary electric contact instead of a more prolonged contact as in the present case.

At approximately the time that the shutter blades are fully opened (in the position of Fig. 3) the plate 171 and switch arm 181 have swung far enough so that the stud 213 passes out of the way of the lug 239 on the operating lever 229, thus allowing this lug to slip by the stud 213. Thereupon the light spring 211 immediately swings the plate 171 and the switch 181 back in a counterclockwise direction, so that the switch arm 181 passes off of the metal plate 159 and onto the insulating block 157, opening the switch again. The parts thus come to rest in the positions shown in Figs. 1 and 4. With the switch now open, it is safe immediately to insert a new photoflash lamp in the socket, without danger of premature firing. The switch is not closed again during the setting or tensioning of the shutter, but is closed only upon the making of the next exposure.

The timing of the closing of the electric switch with relation to the opening of the shutter blades is governed by the sizes and proportions of the various parts, of course, and may be somewhat varied during the manufacturing operations, for example, by varying the relationship between the stud 221 and the surface 225, or the relationship between the ear 239 and the stud 213. Two of the most popular types of photoflash bulbs or lamps are class F and class M lamps, having time lags respectively of about 5 milliseconds and 20 milliseconds from the closing of the electric circuit to the production of maximum brilliance of illumination. Preferably the present synchronizer mechanism is so proportioned that the electric switch will be closed approximately 5 milliseconds before the shutter blades reach their maximum open position, or approximately 1.5 milliseconds to 3 milliseconds before pin-point opening of the blades, depending upon the length of time required for the blades to open from pin-point position to fully open position, which in turn depends upon the strength of the master spring 59 and various other factors. If the synchronizer is thus timed to close the switch at approximately 5 milliseconds before the blades reach full open position, then the synchronizer may be used effectively with class F photoflash bulbs at all speed settings of the shutter including B and T, and it may be used effectively with class M photoflash lamps at speed settings of 1/50 second or slower, including B and T.

It is seen from the foregoing disclosure that the abovementioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A photographic shutter of the type including an annular casing having a central lens opening, a shutter blade movable from a closed position to an open position and back to a closed position, a master member in the form of a lever pivoted intermediate its length and movable within said casing in a first direction to tension the master member and in a second direction to initiate a cycle of opening and closing movements of said blade, and electric circuit connections for operating a flash lamp in synchronism with said movements of said blade, characterized by a stationary switch block having an insulating portion and a conducting portion having surfaces substantially flush with each other, an electric switch part within said casing and pivoted for movement therein between open and closed positions, said switch part including a resilient finger constantly engaging and adapted to slide over said flush surfaces, said finger engaging said insulating portion of said block when said switch part is in open position and engaging said conducting portion of said block when said switch part is in closed position, first spring means constantly tending to maintain said switch part in open position, a switch operating member pivoted within said casing and movable in two directions, said operating member having a one-way driving connection with said switch part so that movement thereof in a first direction is normally ineffective to move said switch part, reverse movement thereof in a second direction being effective to engage said switch part and move it to closed position, second spring means constantly tending to move said operating member in said second direction with sufficient force to overcome the resistance of said first spring means, and a part on said master member for engaging said switch operating member to move said operating member in its first direction against the force of said second spring means when said master member moves in its first direction, the tendency of said last mentioned spring being to constantly urge the operating member into a follow up contact with such master member part at all times, said master member engaging said operating member only on one side in a direction to resist movement of said operating member under the influence of said second spring means and being free of contacts with said operating member in a direction to assist said second spring means, movement of said master member in its second direction serving to allow said second spring means to move said operating member in its second direction at a rate not greater than the rate of movement of said master member in its second direction the operating member and its spring being prevented from a faster rate of movement than that of the master member by the said follow up contact of the operating member with respect thereto.

2. A construction in accordance with claim 1, further characterized by a stud on said switch part having a beveled end, and a resilient ear on said operating member to engage said stud to move said switch part to closed position during the first part of movement of said operating member in its second direction, continued movement thereof in its second direction causing said ear to disengage said stud so that said first spring means may return said switch part to open position, movement of said operating member in its first direction causing said resilient ear to snap over said beveled end of said stud to reset said ear ready for the next movement of said operating member in its second direction.

3. A photographic shutter including a shutter blade movable through a cycle of operation from a closed position to an open position and back to a closed position, a master member movable in a first direction to prepare the shutter for a cycle of operation and movable in a second direction to initiate a cycle of operation, a pivoted operating member having a portion lying in the path of travel of said master member to be moved thereby in a first direction when said master member moves in its first direction, superior spring means resisting movement of said operating member in its first direction and constantly tending to move it and the master member reversely in a second direction so far as permitted by movement of said master member, said spring means constantly urging said operating member toward and keeping it constantly engaged with the master member in all positions of the master member, said master member engaging said operating member only on one side in a direction to resist movement of said operating member under the influence of said superior spring means and being free of contact with said operating member in a direction to assist said superior spring means, an electric switch including a pivoted part movable between open and closed positions, spring means inferior to said last mentioned spring means tending to move said switch part to open position, electric circuit connections leading from said electric switch and adapted to be connected to a photoflash lamp, and interengaging parts on said operating member and said switch part for moving said switch part to closed position during the first part of movement of said operating member in its second direction under the influence of its superior spring and thereafter releasing said switch part during continued movement of said operating member in its second direction so that said switch part may be returned to its open position by its associated inferior spring means, said interengaging parts including an abutment on said switch part mounted to swing about one pivotal axis when said switch part is moved and a pawl on said operating member mounted to swing about a differential pivotal axis when said operating member is moved, the pawl pushing against said abutment during part of the swinging movement of the operating member to move the switch part from the operating member, the respective arcs of swinging movement of said pawl and said abutment carrying them away from each other as the joint swinging movement continues so that the pawl becomes disengaged from said abutment to permit said inferior spring means to return said switch part to its open position before the return of said operating member and pawl, said pawl being sufficiently resilient to be displaced to pass over said abutment when said operating member moves in the opposite direction.

4. A construction in accordance with claim 3, in which said movable switch part swings on a pivotal axis and has an electric conducting portion located on said axis, and in which said electric circuit connection include a resilient conducting strip held in sprung condition against the portion of said switch part which is located on said axis.

5. A construction in accordance with claim 1, in which an arcuate contact plate having adjoining conducting and insulating segments in surface continuation of one another is provided in the circuit, the contact segment being the longer, and the switch part embodies a pivoted arm with its tip traversing the plate between an open position on the insulating segment and a closed position on the contact segment.

6. A construction in accordance with claim 1, in which the casing encloses a separate rearwardly arranged mounting plate upon which the master member and blade mechanisms are carried, the mounting plate in turn carries a relatively spaced sub-mounting plate overlying the master member and provided with an elongated opening, the electric switch part, the switch operating member and both of the spring means are all assembled on the sub-mounting plate, and the part on the master member for engaging the switch operating means projects through the elongated opening in the sub-mounting plate for this purpose.

7. A construction in accordance with claim 6 in which the switch part embodies a base plate pivoted on the sub-mounting plate to take contact from the switch operating member, and an overlying electric contact arm mounted on the base plate but spaced and insulated therefrom, said arm having an extension resting on but insulated from the pivot of the base plate, the casing is provided with electric terminals in the circuit extending into the annular interior, and there is provided a resilient, arcuate metal strip connected at one end to one of the said terminals and resting at the other on the said extension of the contact arm of the switch member.

8. A construction in accordance with claim 7, in which the sub-mounting plate carries a superposed, arcuate contact plate insulated therefrom and having adjoining conducting and insulating segments in surface continution of each other, said contact plate being connected to the other terminal in the shutter casing and the switch member arm being so arranged that its tip traverses the contact plate between an open position on the insulating segment and a closed position on the contact segment.

FRIEDRICH A. GUSTAV PIRWITZ.
GUSTAVE P. PIRWITZ.
JACK H. SUTTON.
GEORGE H. SCHLUETER.

REFERENCES CITED

The following references are of record in the file of this patent:

UNITED STATES PATENTS

| Number | Name | Date |
|---|---|---|
| 1,959,596 | Patterson | May 22, 1934 |
| 2,319,086 | Riddell | May 11, 1943 |
| 2,358,941 | Schwartz | Sept. 26, 1944 |
| 2,404,526 | Pirwitz | July 23, 1946 |
| 2,448,876 | Fuerst | Sept. 7, 1948 |
| 2,469,688 | Fuerst | May 10, 1949 |
| 2,490,163 | Schwarz | Dec. 6, 1949 |